US012020869B2

(12) United States Patent
Kim et al.

(10) Patent No.: US 12,020,869 B2
(45) Date of Patent: Jun. 25, 2024

(54) MULTILAYER ELECTRONIC COMPONENT HAVING IMPROVED ELECTRODE STRUCTURE FOR INCREASED CAPACITY PER UNIT VOLUME

(71) Applicant: SAMSUNG ELECTRO-MECHANICS CO., LTD., Suwon-si (KR)

(72) Inventors: Jun Hyeong Kim, Suwon-si (KR); Myung Jun Park, Suwon-si (KR); Kyu Sik Park, Suwon-si (KR); Eui Hyun Jo, Suwon-si (KR); Jin Yeop Yoo, Suwon-si (KR); Ha Jeong Kim, Suwon-si (KR); Jong Ryeong Kim, Suwon-si (KR); Eun Me Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 240 days.

(21) Appl. No.: 17/469,136

(22) Filed: Sep. 8, 2021

(65) Prior Publication Data

US 2022/0208466 A1 Jun. 30, 2022

(30) Foreign Application Priority Data

Dec. 24, 2020 (KR) .................. 10-2020-0183639

(51) Int. Cl.
*H01G 4/30* (2006.01)
*H01G 4/008* (2006.01)
(Continued)

(52) U.S. Cl.
CPC .............. *H01G 4/30* (2013.01); *H01G 4/008* (2013.01); *H01G 4/012* (2013.01); *H01G 4/1218* (2013.01); *H01G 4/232* (2013.01)

(58) Field of Classification Search
CPC .......... H01G 4/30; H01G 4/008; H01G 4/012; H01G 4/1218; H01G 4/232; H01G 4/0085; H01G 4/2325; H01G 4/005; H01G 4/1209
See application file for complete search history.

(56) References Cited

U.S. PATENT DOCUMENTS

2008/0186652 A1* 8/2008 Lee .................. H01G 4/012
361/306.3
2010/0149769 A1* 6/2010 Lee .................. H01G 4/35
361/768

(Continued)

FOREIGN PATENT DOCUMENTS

JP 2006-086359 A 3/2006
KR 10-2020-0075287 A 6/2020

*Primary Examiner* — David M Sinclair
*Assistant Examiner* — Daniel M Dubuisson
(74) *Attorney, Agent, or Firm* — Morgan, Lewis & Bockius LLP (57) ABSTRACT

A multilayer electronic component includes: a body including dielectric layers and first and second internal electrodes alternately disposed with the dielectric layers respectively interposed therebetween, the first internal electrodes being exposed to two end surfaces of the body, the second internal electrodes being exposed to a mounting surface of the body perpendicular to the end surfaces; a pair of connection portions each including a conductive layer disposed on one of the end surfaces of the body and connected to the first internal electrodes and an insulating layer disposed on the conductive layer; first and second external electrodes disposed on the mounting surface of the body and connected to the conductive layers of the pair of connection portions, respectively; and a third external electrode disposed between the first and second external electrodes on the mounting surface of the body and connected to the second internal electrodes.

17 Claims, 10 Drawing Sheets

(51) Int. Cl.
    *H01G 4/012*    (2006.01)
    *H01G 4/12*    (2006.01)
    *H01G 4/232*    (2006.01)

(56) References Cited

U.S. PATENT DOCUMENTS

| | | | |
|---|---|---|---|
| 2016/0126013 A1* | 5/2016 | Park | H01G 4/232 |
| | | | 361/301.4 |
| 2017/0278633 A1* | 9/2017 | Kato | H01G 4/2325 |
| 2017/0278634 A1* | 9/2017 | Kato | H01G 4/0085 |
| 2017/0278635 A1* | 9/2017 | Mizuno | H01G 2/065 |
| 2017/0316882 A1* | 11/2017 | Park | H01G 4/012 |
| 2017/0352481 A1* | 12/2017 | Park | H01G 4/30 |
| 2017/0367187 A1* | 12/2017 | Chae | H05K 1/181 |
| 2018/0068795 A1* | 3/2018 | Park | H01G 4/2325 |
| 2019/0066923 A1* | 2/2019 | Jung | H01G 4/008 |
| 2019/0103221 A1* | 4/2019 | Park | H01G 4/01 |
| 2020/0194182 A1 | 6/2020 | An et al. | |
| 2020/0312564 A1* | 10/2020 | Onishi | H01G 4/232 |
| 2021/0020377 A1* | 1/2021 | Kurosu | H01G 4/30 |
| 2021/0375548 A1* | 12/2021 | Miyazaki | H01G 4/12 |

* cited by examiner

MULTILAYER ELECTRONIC COMPONENT HAVING IMPROVED ELECTRODE STRUCTURE FOR INCREASED CAPACITY PER UNIT VOLUME

CROSS-REFERENCE TO RELATED APPLICATION(S)

This application claims the benefit of priority to Korean Patent Application No. 10-2020-0183639 filed on Dec. 24, 2020 in the Korean Intellectual Property Office, the disclosure of which is incorporated herein by reference in its entirety.

BACKGROUND

1. Field

The present disclosure relates to a multilayer electronic component.

2. Description of Related Art

A multilayer ceramic capacitor (MLCC), a multilayer electronic component, is a chip-type condenser mounted on the printed circuit boards of various electronic products, such as an image display device, e.g. a liquid crystal display (LCD) or a plasma display panel (PDP), a computer, a smartphone, and a mobile phone, to serve to charge or discharge electricity therein or therefrom.

The multilayer ceramic capacitor may be used as a component for various electronic apparatuses because it has a small size, secures high capacitance, and may be easily mounted. In accordance with miniaturization and an increase in output of various electronic apparatuses such as computers and mobile devices, there has been an increasing demand for miniaturization and an increase in capacitance of the multilayer ceramic capacitor.

In addition, in accordance with a recent increase in function of the electronic component, an amount of current used is increasing, and there has been a demand for a decrease in voltage used in order to increase a battery usage time. Also, there has been a demand for a slim multilayer ceramic capacitor. To this end, it is required to reduce an impedance of a power supply terminal of a set connecting a DC-DC converter and an integrated circuit chip (IC) to each other. As a general way of reducing the impedance, a plurality of multilayer ceramic capacitors connected to each other in parallel have been used, but there has been a problem in that amounting area increases. To cope therewith, a multilayer ceramic capacitor in a three-terminal type has been used by configuring the multilayer ceramic capacitor to have three external electrodes such that an equivalent series inductance (ESL) can be decreased.

In order to achieve the miniaturization and the increase in capacitance of the multilayer ceramic capacitor, it is necessary to increase the number of stacks by forming internal electrodes and dielectric layers to be thin, and it is also necessary to increase an effective volume fraction required for implementing capacitance by forming the external electrodes to have thin layers.

In the related art, as a method that has been mainly used to form an external electrode, surfaces of a body to which the internal electrodes are exposed are dipped into a paste including conductive metal.

However, the external electrode formed by the dipping method has problems in that the external electrode may be too thick in a center portion in a thickness direction, and it may be difficult to secure a high effective volume fraction because the external electrode may also be formed on surfaces of the body to which the internal electrodes are not exposed.

SUMMARY

An aspect of the present disclosure may provide a multilayer electronic component having improved capacity per unit volume.

Another aspect of the present disclosure may provide a multilayer electronic component having improved reliability.

According to an aspect of the present disclosure, a multilayer electronic component includes: a body including dielectric layers and first and second internal electrodes alternately disposed in a first direction with the dielectric layers respectively interposed therebetween, and having first and second surfaces opposing each other in the first direction, third and fourth surfaces connected to the first and second surfaces and opposing each other in a second direction, and fifth and sixth surfaces connected to the first to fourth surfaces and opposing each other in a third direction; a first connection portion including a first conductive layer disposed on the third surface of the body and connected to the first internal electrodes and a first insulating layer disposed on the first conductive layer; a second connection portion including a second conductive layer disposed on the fourth surface of the body and connected to the first internal electrodes and a second insulating layer disposed on the second conductive layer; a first external electrode disposed on the sixth surface of the body and including a first electrode layer connected to the first conductive layer and a first plating layer disposed on the first electrode layer; a second external electrode disposed on the sixth surface of the body and including a second electrode layer connected to the second conductive layer and a second plating layer disposed on the second electrode layer; and a third external electrode disposed between the first and second external electrodes on the sixth surface of the body and including a third electrode layer connected to the second internal electrodes and a third plating layer disposed on the third electrode layer.

According to another aspect of the present disclosure, a multilayer electronic component includes: a body including dielectric layers and first and second internal electrodes alternately disposed with the dielectric layers respectively interposed therebetween, the first internal electrodes being exposed to two end surfaces of the body, the second internal electrodes being exposed to a mounting surface of the body perpendicular to the end surfaces; a pair of connection portions each including a conductive layer disposed on one of the end surfaces of the body and connected to the first internal electrodes and an insulating layer disposed on the conductive layer; first and second external electrodes disposed on the mounting surface of the body and connected to the conductive layers of the pair of connection portions, respectively; and a third external electrode disposed between the first and second external electrodes on the mounting surface of the body and connected to the second internal electrodes.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

In the drawings, a first direction may be defined as a stacked direction or a wide W direction, a second direction may be defined as a length L direction, and a third direction may be defined as a thickness T direction.

Figure 1:
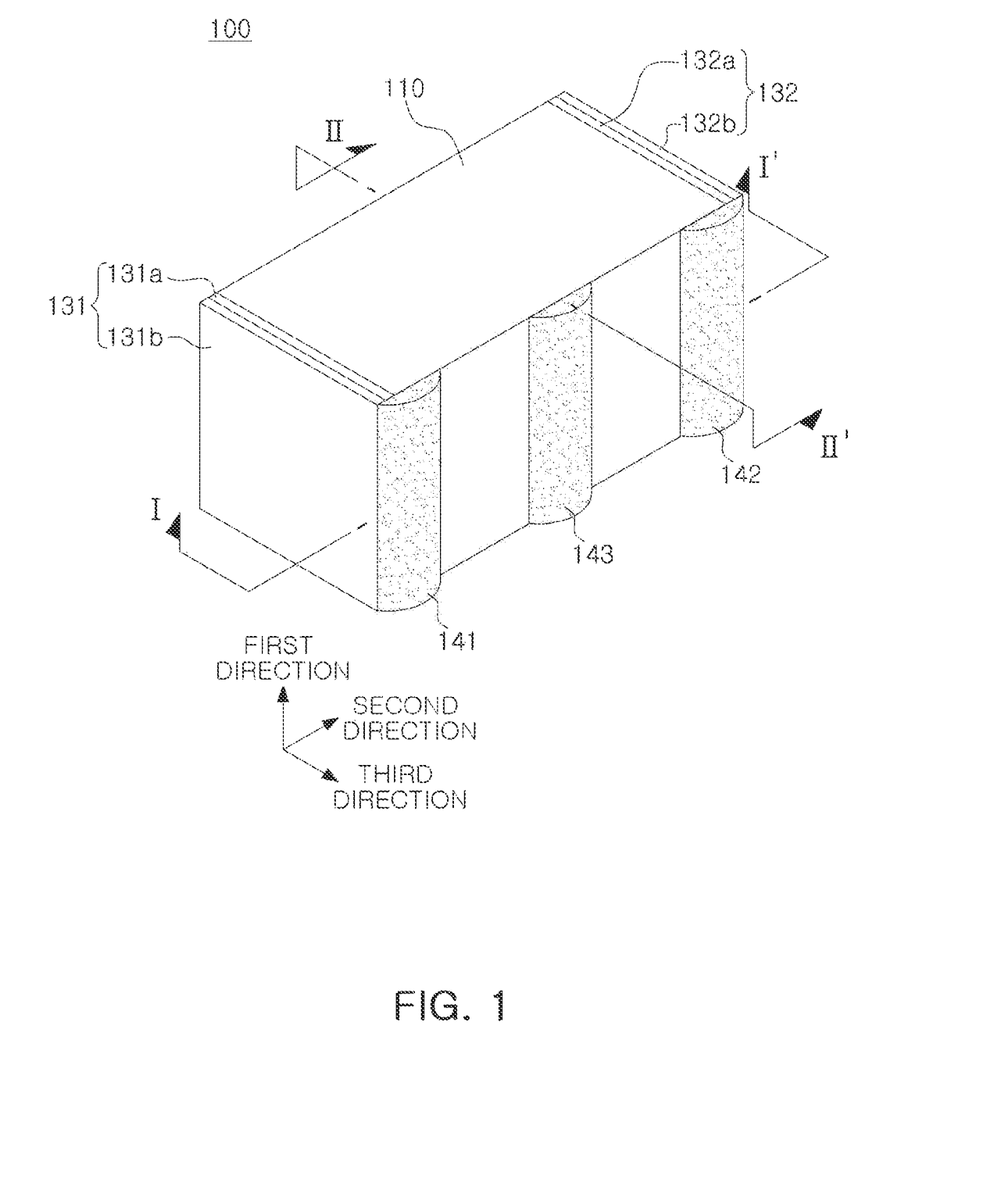
FIG. 1 is a schematic perspective view illustrating a multilayer electronic component according to an exemplary embodiment in the present disclosure.

FIG. 1 is a schematic perspective view illustrating a multilayer electronic component according to an exemplary embodiment in the present disclosure.

Figure 2:
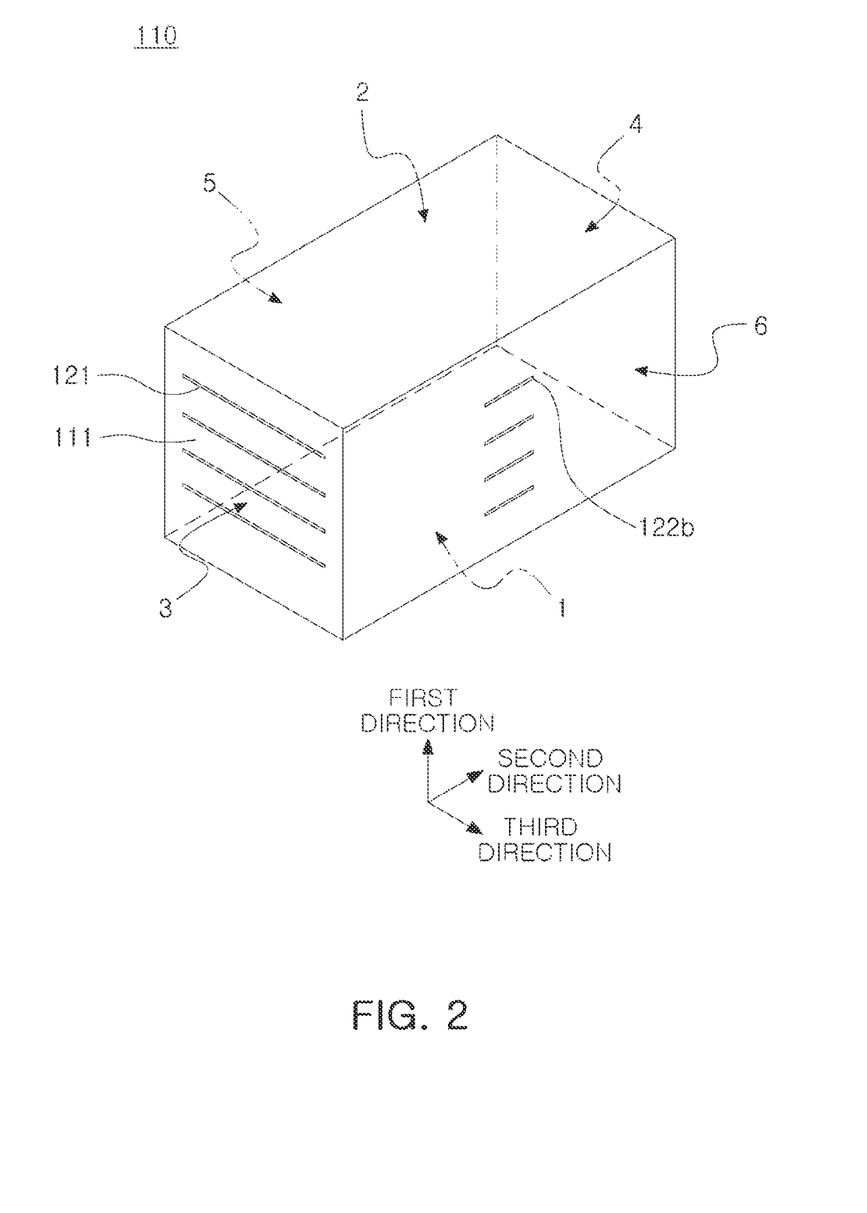
FIG. 2 is a schematic perspective view illustrating a body, except connection portions and external electrodes, in FIG. 1.

FIG. 2 is a schematic perspective view illustrating a body, except connection portions and external electrodes, in FIG. 1.

Figure 3:
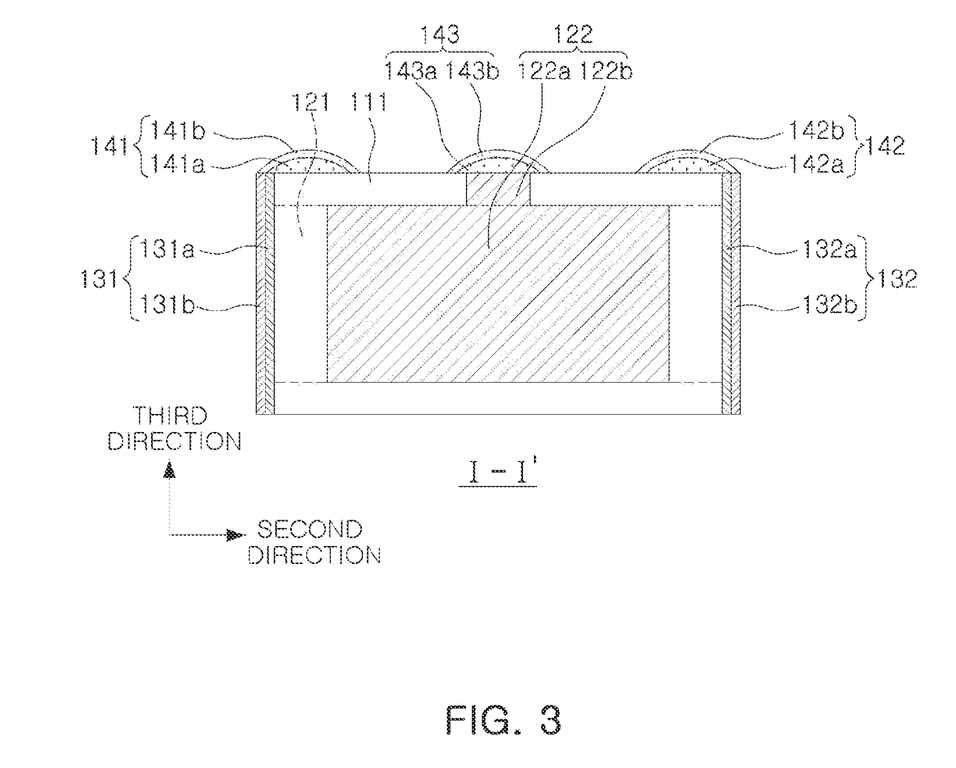
FIG. 3 is a cross-sectional view taken along line I-I' of FIG. 1.

FIG. 3 is a cross-sectional view taken along line I-I' of FIG. 1.

Figure 4:
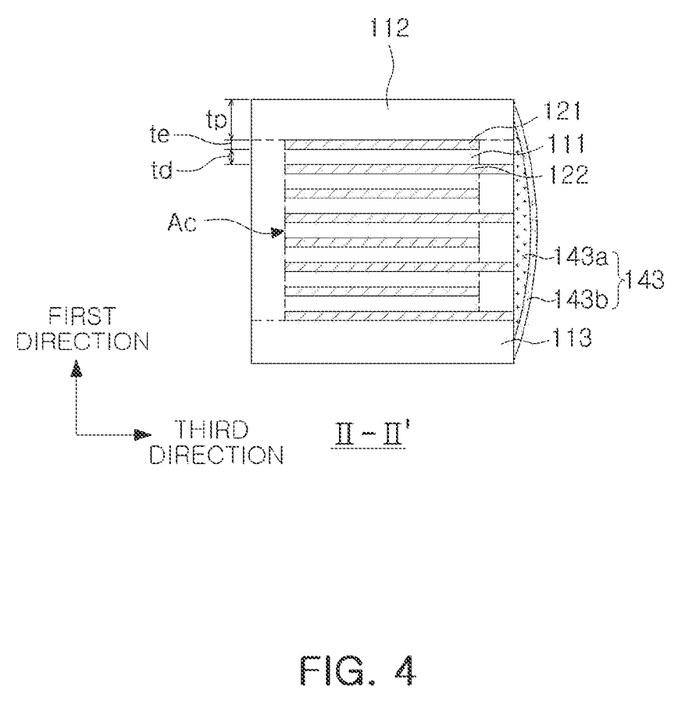
FIG. 4 is a cross-sectional view taken along line II-II' of FIG. 1.

FIG. 4 is a cross-sectional view taken along line II-II' of FIG. 1.

Figure 5:
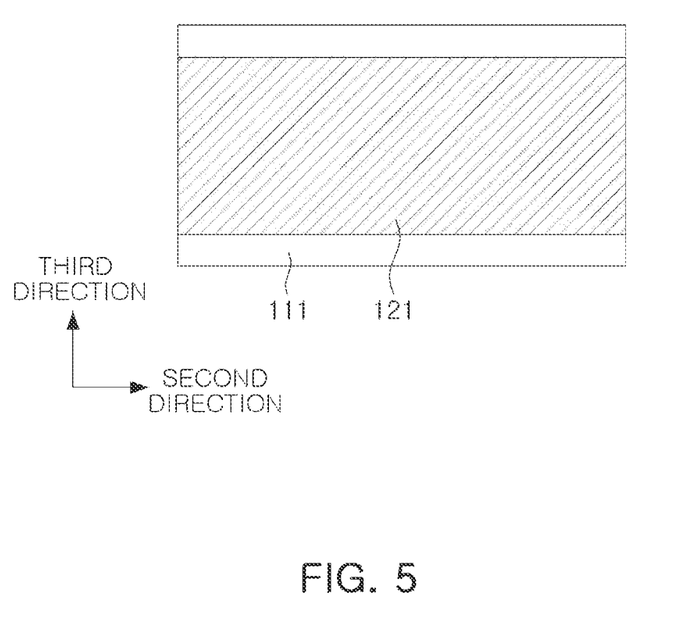
FIG. 5 illustrates that a first internal electrode according to the exemplary embodiment in the present disclosure is disposed on a dielectric layer.

FIG. 5 illustrates that a first internal electrode according to the exemplary embodiment in the present disclosure is disposed on a dielectric layer.

Figure 6:
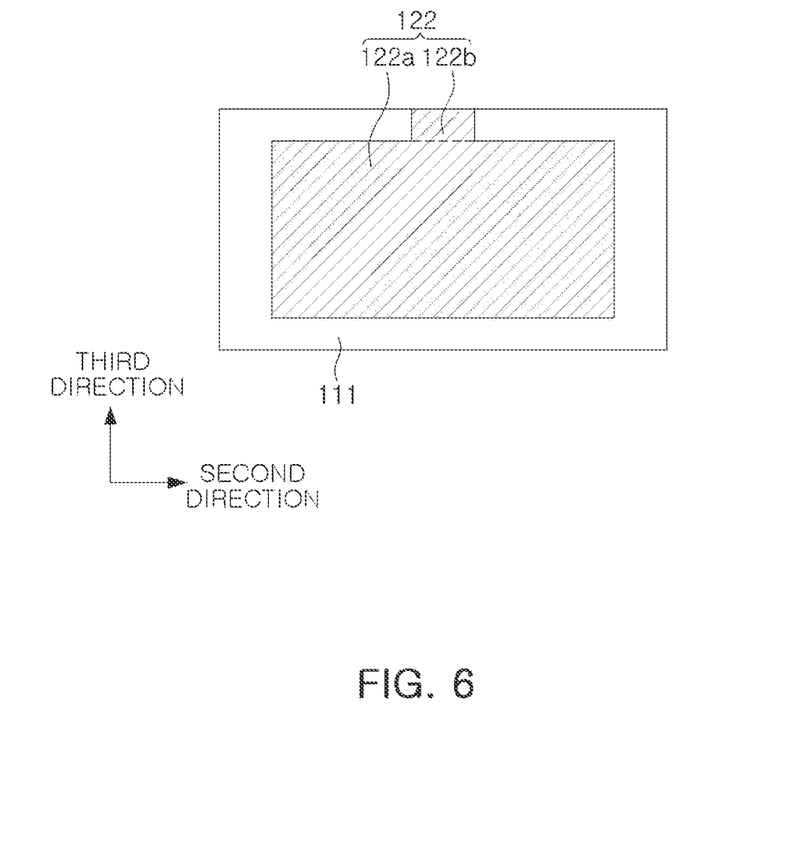
FIG. 6 illustrates that a second internal electrode according to the exemplary embodiment in the present disclosure is disposed on a dielectric layer.

FIG. 6 illustrates that a second internal electrode according to the exemplary embodiment in the present disclosure is disposed on a dielectric layer.

Hereinafter, a multilayer electronic component 100 according to an exemplary embodiment in the present disclosure will be described with reference to FIGS. 1 through 6.

The multilayer electronic component 100 according to the exemplary embodiment in the present disclosure may include: a body 110 including dielectric layers 111 and first and second internal electrodes 121 and 122 alternately disposed in the first direction with respective dielectric layers interposed therebetween, and having first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction; a first connection portion 131 including a first conductive layer 131a disposed on the third surface 3 of the body 110 and connected to the first internal electrodes 121 and a first insulating layer 131b disposed on the first conductive layer 131a; a second connection portion 132 including a second conductive layer 132a disposed on the fourth surface 4 of the body 110 and connected to the first internal electrodes 121 and a second insulating layer 132b disposed on the second conductive layer 132a; a first external electrode 141 disposed on the sixth surface 6 of the body 110 and including a first electrode layer 141a connected to the first conductive layer 131a and a first plating layer 141b disposed on the first electrode layer 141a; a second external electrode 142 disposed on the sixth surface 6 of the body 110 and including a second electrode layer 142a connected to the second conductive layer 132a and a second plating layer 142b disposed on the second electrode layer 142a; and a third external electrode 143 disposed between the first and second external electrodes 141 and 142 on the sixth surface 6 of the body 110 and including a third electrode layer 143a connected to the second internal electrodes 122 and a third plating layer 143b disposed on the third electrode layer 143a.

In the body 110, the dielectric layers 111 and the internal electrodes 121 and 122 may be alternately stacked.

A specific shape of the body 110 is not particularly limited, and may be a hexahedral shape or a shape similar to the hexahedral shape, as illustrated in the drawings. Although the body 110 does not have a hexahedral shape having perfectly straight lines due to shrinkage of ceramic powders included in the body 110 in a sintering process, the body 110 may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 may be in a sintered state, and the dielectric layers 111 may be integrated with each other, making it difficult to identify a boundary between adjacent dielectric layers 111 without using a scanning electron microscope (SEM).

According to the exemplary embodiment in the present disclosure, a raw material forming the dielectric layer 111 is not particularly limited as long as a sufficient capacitance may be obtained. For example, a barium titanate-based material, a lead composite perovskite-based material, a strontium titanate-based material, or the like may be used as the raw material of the dielectric layer 111. The barium titanate-based material may include $BaTiO_3$-based ceramic powders. Examples of the $BaTiO_3$-based ceramic powders may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like is partially solid-dissolved in $BaTiO_3$.

In addition, the raw material forming the dielectric layer 111 may include various ceramic additives, organic solvents, binders, dispersants, and the like added to powders, such as barium titanate ($BaTiO_3$) powders, according to an object of the present disclosure.

Meanwhile, a thickness td of the dielectric layer 111 does not need to be particularly limited. However, the thickness td of the dielectric layer 111 may be 0.6 μm or less in order to more easily achieve miniaturization and an increase in capacitance of the multilayer electronic component. Here, the thickness td of the dielectric layer 111 may refer to an average thickness of the dielectric layers 111.

The body 110 may include a capacitance forming portion Ac disposed in the body 110 and forming a capacitance by including first internal electrodes 121 and second internal electrodes 122 disposed to face each other with respective dielectric layers 111 interposed therebetween and cover portions 112 and 113 formed on upper and lower surfaces of the capacitance forming portion Ac in the first direction, respectively.

In addition, the capacitance forming portion Ac, which contributes to forming a capacitance of a capacitor, may be formed by repeatedly stacking a plurality of first and second internal electrodes 121 and 122 with respective dielectric layers 111 interposed therebetween.

The cover portions 112 and 113 may include an upper cover portion 112 disposed on the upper surface of the capacitance forming portion Ac in the first direction and a lower cover portion 113 disposed on the lower surface of the capacitance forming portion Ac in the first direction.

The upper cover portion 112 and the lower cover portion 113 may be formed by stacking a single dielectric layer or two or more dielectric layers on each of the upper and lower surfaces of the capacitance forming portion Ac in the thickness direction, and may basically serve to prevent damage to the internal electrodes due to physical or chemical stress.

The upper cover portion 112 and the lower cover portion 113 may include the same type of material as the dielectric layers 111, while not including internal electrodes.

That is, the upper cover portion 112 and the lower cover portion 113 may include a ceramic material such as a barium titanate ($BaTiO_3$)-based ceramic material.

Meanwhile, a thickness of each of the cover portions 112 and 113 does not need to be particularly limited. However, the thickness tp of each of the cover portions 112 and 113 may be 20 μm or less in order to more easily achieve the miniaturization and the increase in capacitance of the multilayer electronic component.

The internal electrodes 121 and 122 may be stacked alternately with the dielectric layers 111.

The internal electrodes 121 and 122 may include first and second internal electrodes 121 and 122 alternately disposed with respective dielectric layers 111 interposed therebetween.

The first internal electrodes 121 may be exposed to the third and fourth surfaces 3 and 4 of the body 110 and connected to the first and second conductive layers 131a and 132a. One end portion of each of the first internal electrodes 121 in the second direction may be connected to the first conductive layer 131a, and the other end portion of each of the first internal electrodes 121 in the second direction may be connected to the second conductive layer 132a. The first internal electrodes 121 may be disposed to be spaced apart from the fifth and sixth surfaces 5 and 6 of the body 110.

Each of the second internal electrodes 122 may include a lead portion 122b disposed to be spaced apart from the third and fourth surfaces 3 and 4 of the body 110 and connected to the sixth surface 6 of the body 110. Each of the second internal electrodes 122 may include a main portion 122a disposed to be spaced apart from the third and fourth surfaces 3 and 4 of the body 110 and overlapping the first internal electrodes 121. The lead portion 122b may serve to electrically connect the third electrode layer 143a and the main portion 122a to each other.

In this case, the first and second internal electrodes 121 and 122 may be electrically disconnected from each other by the dielectric layers 111, each being disposed therebetween.

The body 110 may be formed by alternately stacking ceramic green sheets on which the first internal electrodes 121 are printed and ceramic green sheets on which the second internal electrodes 122 are printed and then sintering the stacked ceramic green sheets.

A material for forming the internal electrodes 121 and 122 is not particularly limited, and may have excellent electrical conductivity. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and an alloy thereof.

In addition, the internal electrodes 121 and 122 may be formed by printing a conductive paste for an internal electrode including one or more of nickel (Ni), copper (Cu), palladium (Pd), silver (Ag), gold (Au), platinum (Pt), tin (Sn), tungsten (W), titanium (Ti), and an alloy thereof on ceramic green sheets. A method of printing the conductive paste for an internal electrode may be a screen printing method, a gravure printing method, or the like, but is not limited thereto.

Meanwhile, a thickness te of each of the internal electrodes 121 and 122 does not need to be particularly limited. However, the thickness te of each of the internal electrodes 121 and 122 may be 0.6 μm or less in order to more easily achieve the miniaturization and the increase in capacitance of the multilayer electronic component. Here, the thickness te of each of the internal electrodes 121 and 122 may refer to an average thickness of the first and second internal electrodes 121 and 122.

The connection portions 131 and 132 may be disposed on the third surface 3 and the fourth surface 4 of the body 110, respectively.

The connection portions 131 and 132 may include a first connection portion 131 disposed on the third surface 3 of the body 110 and a second connection portion 132 disposed on the fourth surface 4 of the body 110.

The first connection portion 131 may include a first conductive layer 131a disposed on the third surface 3 of the body 110 and connected to the first internal electrodes 121 and a first insulating layer 131b disposed on the first conductive layer 131a. The second connection portion 132 may include a second conductive layer 132a disposed on the fourth surface 4 of the body 110 and connected to the first internal electrodes 121 and a second insulating layer 132b disposed on the second conductive layer 132a.

In the related art, as a method that has been mainly used to form an external electrode, a surface of a body to which internal electrodes are exposed is dipped into a paste including conductive metal. However, the external electrode formed by the dipping method may be too thick in a center portion in the thickness direction. In the dipping method, in addition to the thickness imbalance problem of the external electrode, since the internal electrodes are exposed to third and fourth surfaces of the body, external electrodes disposed on the third and fourth surfaces of the body are formed to have a predetermined thickness or more in order to suppress penetration of moisture and plating solution through the external electrodes.

In contrast, according to exemplary embodiments of the present disclosure, the insulating layers 131b and 132b are disposed on the conductive layers 131a and 132a, even though the conductive layers 131a and 132a on the third and fourth surfaces 3 and 4 of the body 110, to which the internal electrodes are exposed, have a relatively small thickness. As such, sufficient reliability can be secured.

The first and second conductive layers 131a and 132a may correspond to the third and fourth surfaces 3 and 4 of the body 110 in shape, respectively, as illustrated in FIG. 1, and surfaces of the first and second conductive layers 131a and 132a opposing the body 110 may have areas equal to those of the third and fourth surfaces 1 and 2 of the body 110, respectively. The first and second conductive layers 131a and 132a may be disposed in a range not beyond the third and fourth surfaces 3 and 4 of the body 110. The first and second conductive layers 131a and 132a may be disposed to not extend onto the first, second, fifth, and sixth surfaces 1, 2, 5, and 6 of the body 110.

In addition, the first and second conductive layers 131a and 132a may have a more uniform and smaller thickness, as compared with external electrodes formed by the dipping method according to the related art. Furthermore, since the internal electrodes and the external electrodes are not connected to each other through via electrodes penetrating through the body, a capacitance per unit volume can be improved without causing a problem such as a crack in the body.

A method of forming the first and second conductive layers 131a and 132a does not need to be particularly limited, and the first and second conductive layers 131a and 132a may be formed, for example, by transferring sheets each including conductive metal or an organic material such as a binder onto the third and fourth surfaces 3 and 4 of the body 110.

A thickness of each of the conductive layers 131a and 132a is not particularly limited, and may be, for example, 2 to 7 µm. Here, the thickness of each of the conductive layers 131a and 132a may refer to a maximum thickness, and may refer to a size of each of the conductive layers 131a and 132a in the second direction.

In the exemplary embodiment, the conductive layers 131a and 132a may include metal and glass, the metal included in the conductive layers 131a and 132a being in the same type as that included in the inner electrodes 121 and 122. As the conductive layers 131a and 132a include the same type of metal as that included in the inner electrodes 121 and 122, electrical connectivity between the conductive layers 131a and 132a and the inner electrodes 121 and 122 can be improved. In addition, as the conductive layers 131a and 132a include glass, bonding strength between the insulating layers 131b and 132b and the body 110 can be improved. In this case, the metal in the same type as that included in the internal electrodes 121 and 122 may be Ni.

The first and second insulating layers 131b and 132b may be disposed on the first and second conductive layers 131a and 132a, respectively, to serve to prevent formation of plating layers on the conductive layers 131a and 132a. In addition, the insulating layers 131b and 132b may serve to improve sealing properties, thereby minimizing penetration of moisture or plating solution from the outside.

The insulating layers 131b and 132b may include an insulating material. The insulating material does not need to be particularly limited, and the insulating material may be, for example, an insulating resin or ceramic.

The insulating layers 131b and 132b may be disposed so that a size thereof in the third direction is 80% or more of a size of the conductive layers 131a and 132a in the third direction. When the size of the insulating layers 131b and 132b in the third direction is less than 80% of the size of the conductive layers 131a and 132a in the third direction, the effects of the insulating layers 131b and 132b may be insufficient in preventing formation of plating layers on the conductive layers 131a and 132a and in improving sealing properties. Meanwhile, an upper limit of the size of the insulating layers 131b and 132b in the third direction is not particularly limited, and the insulating layers 131b and 132b may partially extend onto the fifth and sixth surfaces 5 and 6 of the body 110 in a range not to increase a size of the multilayer electronic component 100 in the third direction. A method of forming the insulating layers 131b and 132b does not need to be particularly limited, and may be formed, for example, by transferring sheets each including $BaTiO_3$ and an organic material such as a binder onto the conductive layers 131a and 131b.

A thickness of each of the insulating layers 131b and 132b is not particularly limited, and may be, for example, 3 to 15 µm. Here, the thickness of each of the insulating layers 131b and 132b may refer to a maximum thickness, and may refer to a size of each of the insulating layers 131b and 132b in the second direction.

The external electrodes 141, 142, and 143 may be disposed on the sixth surface 6 of the body 110.

The first and second external electrodes 141 and 142 may be electrically connected to the first internal electrodes 121 through the first and second conductive layers 131a and 132a, respectively, and the third external electrode 143 may be disposed between the first and second external electrodes 141 and 142 and electrically connected to the second internal electrodes 122.

The first and second external electrodes 141 and 142 may be signal electrodes, and the third external electrode 143 may be a ground electrode. Since the external electrodes are configured in a three-terminal type as described above, an equivalent series inductance (ESL) can be decreased.

The external electrodes formed by the dipping method according to the related art have a problem in that, since the external electrodes are formed to be thick on the third and fourth surfaces 3 and 4 of the body 110 and to partially extend onto the first, second, fifth, and sixth surfaces 1, 2, 5 and 6 of the body 110, it is difficult to secure a high effective volume fraction. In addition, in a multilayer ceramic capacitor (MLCC) in a three-terminal type according to the related art, it is general that external electrodes corresponding to ground electrodes are disposed on the fifth and sixth surfaces 5 and 6 of the body 110 and partially extend onto the first and second surfaces 1 and 2 of the body 110, and thus, it is difficult to secure a high effective volume fraction.

In contrast, according to the present disclosure, since the external electrodes 141, 142, and 143 are disposed on the sixth surface 6 of the body 110, a high effective volume fraction can be secured. In this case, the surface of the body 110 on which the external electrodes 141, 142, and 143 are disposed may be a mounted surface.

Meanwhile, as a way of minimizing a size of the multilayer electronic component in the second direction, it may be considered that the internal electrodes and the external electrodes are connected to each other through via electrodes penetrating through the body, but there is concern that formation of via holes penetrating through the body may cause a problem such as a crack in the body. According to the present disclosure, since the first internal electrodes 121 are connected to the first and second external electrodes 141 and 142 through the connection portions 131 and 132, a capacitance per unit volume can be improved without causing a problem such as a crack in the body.

The electrode layers 141a, 142a, and 143a may be formed of any material having electrical conductivity, such as metal, and a specific material for the electrode layers 141a, 142a, and 143a may be determined in consideration of electrical characteristics, structural stability, and the like. For example, the electrode layers 141a, 142a, and 143a may be firing electrodes including conductive metal and glass, and the electrode layers 141a, 142a, and 143a may be formed by applying a paste including conductive metal and glass on the sixth surface 6 of the body 110.

The conductive metal included in the electrode layers 141a, 142a, and 143a may be a material having excellent electrical connectivity, but is not particularly limited thereto. For example, the conductive metal may be one or more of nickel (Ni), copper (Cu), and an alloy thereof.

The plating layers 141b, 142b, and 143b may be disposed on the electrode layers 141a, 142a, and 143a, respectively. The plating layers 141b, 142b, and 143b may serve to improve mounting characteristics. A type of the plating layers 141b, 142b, and 143b is not particularly limited, and each of the plating layers 141b, 142b, and 143b may be a plating layer including one or more of Ni, Sn, Pd, and an alloy thereof, and may be formed as a plurality of layers.

As a more specific example of the plating layers 141b, 142b, and 143b, each of the plating layers 141b, 142b, and 143b may be a Ni plating layer, a Sn plating layer, or a combination of a Ni plating layer and a Sn plating layer that are sequentially formed on each of the electrode layers 141a, 142a, and 143a.

The smaller size the multilayer electronic component 100 has, the greater effect the formation of the external electrodes as thin layers causes in improving the capacitance per unit volume. Accordingly, the multilayer electronic component 100 having a size of 1005 (length×width, 1.0 mm×0.5 mm) or less may exhibit a significant effect in improving the capacitance per unit volume according to the present disclosure.

With respect to a multilayer electronic component having a size of 1005 (length×width, 1.0 mm×0.5 mm), it has been confirmed that the multilayer electronic component including insulating portions and external electrodes according to the exemplary embodiment in the present disclosure in an inventive example has an effective capacitance that increases by about 18%, causing an significantly improved effect in capacitance per unit volume, as compared with that including three-terminal external electrodes formed by the dipping method according to the related art in a comparative example.

Therefore, considering a manufacturing error, a maximum size of the multilayer electronic component 100 in the second direction may be 1.1 mm or less, and a maximum size of the multilayer electronic component 100 in the first direction may be 0.55 mm or less. In this case, the maximum size of the multilayer electronic component in the second direction may refer to a maximum length of the multilayer electronic component, and the maximum size of the multilayer electronic component in the first direction may refer to a maximum width of the multilayer electronic component.

Figure 7:
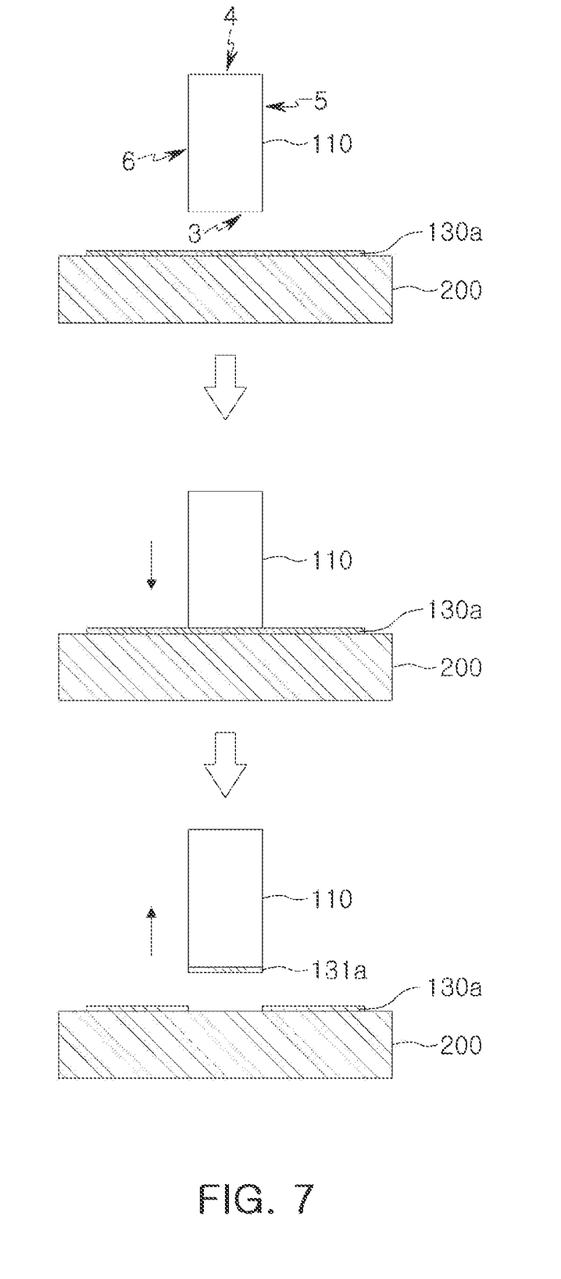
FIGS. 7 through 9 are diagrams illustrating a method of manufacturing the multilayer electronic component according to the exemplary embodiment in the present disclosure.
Figure 8:
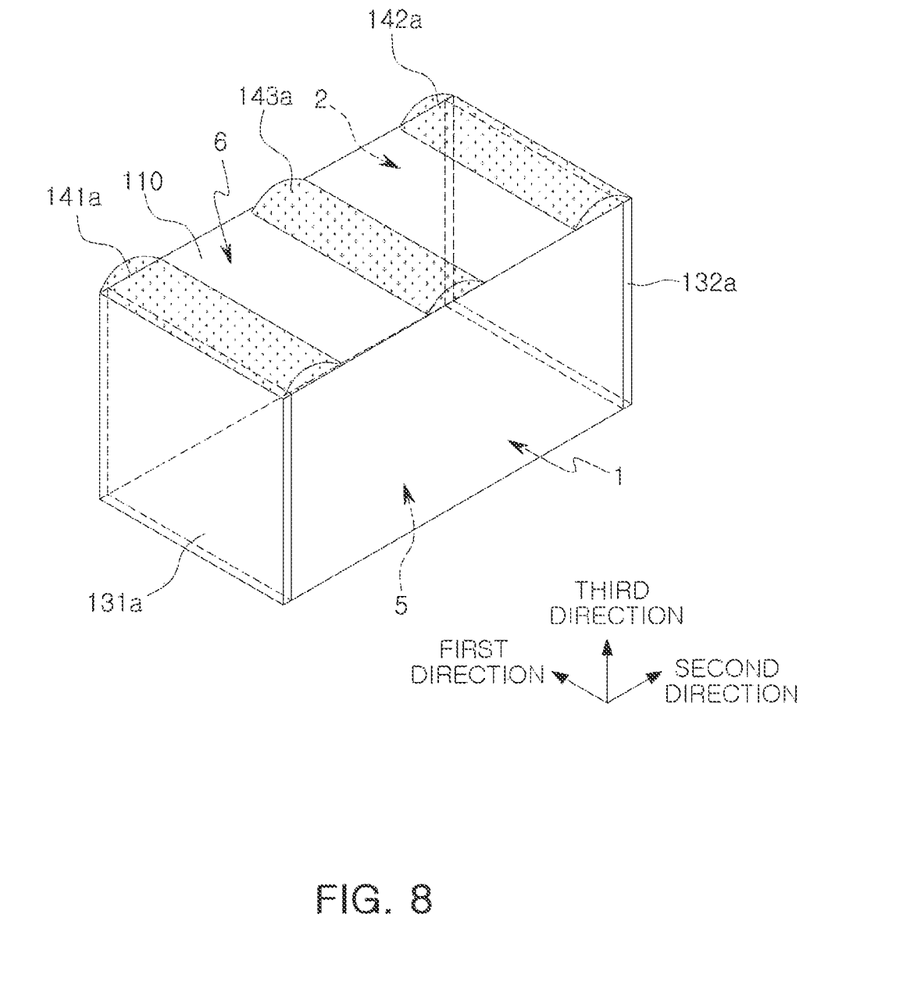
Figure 9:
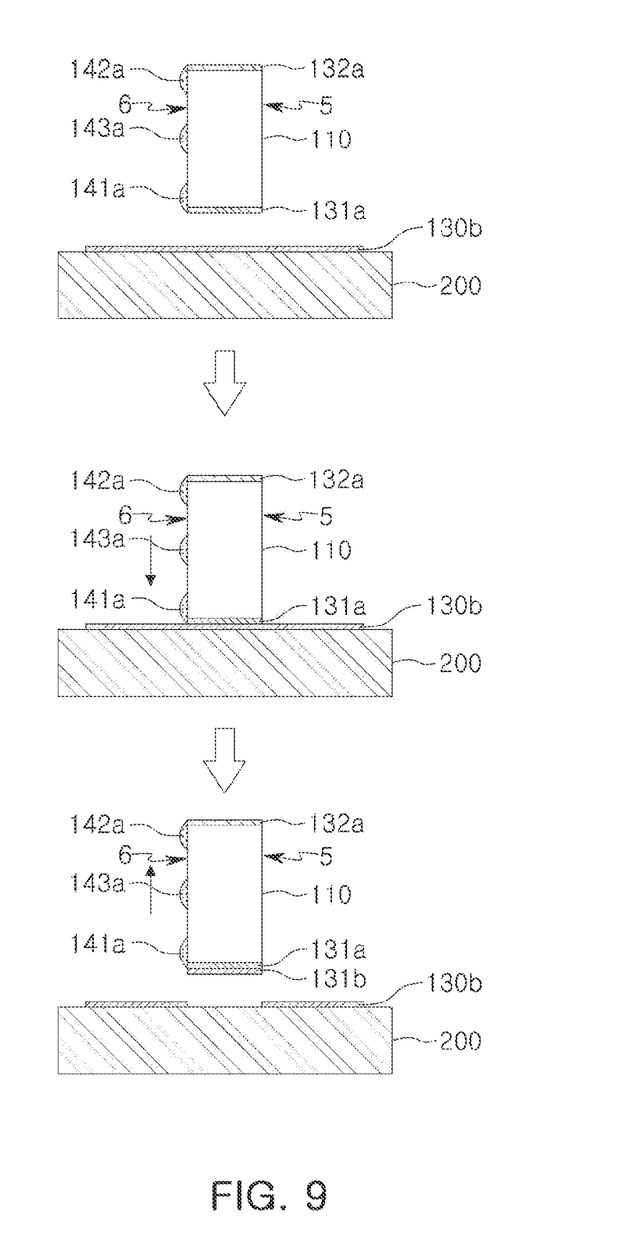

FIGS. 7 through 9 are diagrams illustrating a method of manufacturing the multilayer electronic component according to the exemplary embodiment in the present disclosure.

Referring to FIG. 7, in a process of transferring the first conductive layer 131a, a conductive layer sheet 130a may be provided on a support 200 and then the body 110 is compressed to the conductive layer sheet 130a, such that the first conductive layer 131a adheres to the third surface 3 of the body 110. The conductive layer sheet 130a, which is in a state before being sintered, may include a binder and an organic solvent. Thereafter, the same process may be repeated with respect to the fourth surface 4 of the body 110, such that the second conductive layer 132a adheres to the fourth surface 4 of the body 110.

Thereafter, as illustrated in FIG. 8, the first, second and third electrode layers 141a, 142a, and 143a may be formed by applying the paste for an external electrode to the sixth surface 6 of the body 110. By forming the first and second electrode layers 141a and 142a before forming the insulating layers 131b and 132b, electrical connectivity between the conductive layers 131a and 132a and the first and second electrode layers 141a and 142a can be sufficiently secured.

Thereafter, as illustrated in FIG. 9, an insulating layer sheet 130b may be provided on the support 200 and then the body 110 is compressed to the insulating layer sheet 130b, such that the first insulating layer 131b adheres to a surface of the first conductive layer 131a. The insulating layer sheet 130b, which is in a state before being sintered, may include a binder, an organic solvent, and the like. Thereafter, the same process may be repeated with respect to the fourth surface 4 of the body 110, such that the second insulating layer 132b adheres to a surface of the second conductive layer 132a.

Thereafter, the plating layers 141b, 142b, and 143b may be formed on the electrode layers 141a, 142a, and 143a, respectively, by performing a plating process. By forming the plating layers 141b, 142b, and 143b after forming the insulating layers 131b and 132b on the conductive layers 131a and 132a, respectively, the formation of the plating layers on the conductive layers 131a and 132a can be prevented to minimize the size of the multilayer electronic component in the second direction, thereby improving a capacitance per unit volume.

Figure 10:
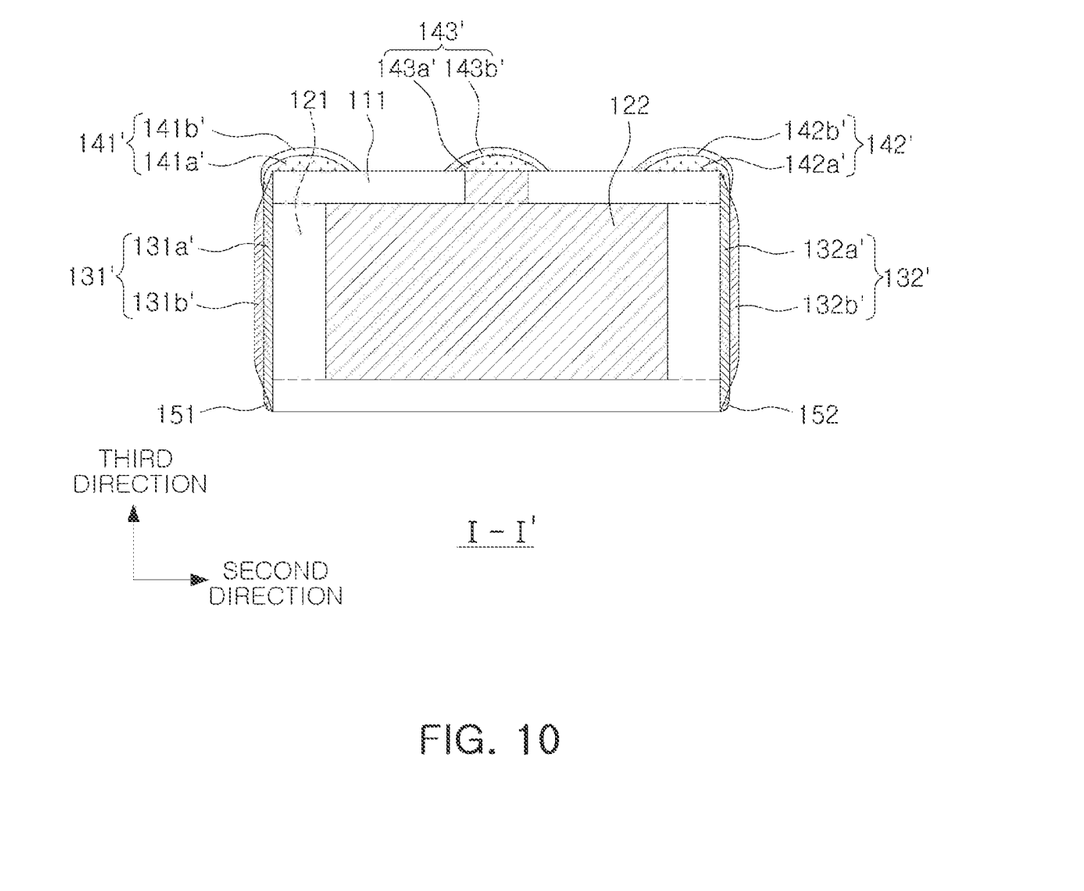
FIG. 10 is a cross-sectional view taken along line I-I' of FIG. 1 as a modified example of the exemplary embodiment in the present disclosure.

FIG. 10 is a cross-sectional view taken along line I-I' of FIG. 1 as a modified example of the exemplary embodiment in the present disclosure.

Referring to FIG. 10, a first electrode layer 141a' may be disposed to extend to cover one end portion of a first conductive layer 131a' in the third direction, and a second electrode layer 142a' may be disposed to extend to cover one end portion of a second conductive layer 132a' in the third direction. Accordingly, respective bonding areas between the electrode layers 141a' and 142a' and the conductive layers 131a' and 132a' can be increased, thereby improving electrical connectivity therebetween.

In this case, each of the first and second conductive layers 131a' and 132a' may have a thickness that is smaller in one end portion than in a center portion in the third direction. Here, the thicknesses of each of the first and second conductive layers 131a' and 132a' may refer to a size of each of the first and second conductive layers 131a' and 132a' in the second direction. Accordingly, a decrease in effective volume fraction can be prevented, while increasing the respective bonding areas between the electrode layers 141a' and 142a' and the conductive layers 131a' and 132a' to improve the electrical connectivity therebetween.

Since the conductive layers 131a' and 132a' are formed by transferring sheets, the conductive layers 131a' and 132a' may have a more uniform and smaller thickness than those formed by the dipping method according to the related art. However, since a part of the sheet adheres to the body while the sheet is cut by compression, each of the conductive layers 131a' and 132a' may be subjected to higher pressure in both end portions than in a central portion in the third direction, and thus may have a thickness that is smaller in the both end portions than in the central portion in the third direction. That is, the other end portion of each of the first and second conductive layers 131a' and 132a' in the third direction may also have a thickness smaller than that of the center portion of each of the first and second conductive layers 131a' and 132a' in the third direction.

In addition, each of the insulating layers 131b' and 132b' may be disposed so that a length thereof in the third direction is 80% or more of a length of each of the conductive layers 131a' and 132a' in the third direction. When a maximum length of each of the insulating layers 131b' and 132b' in the third direction is smaller than that of each of the conductive layers 131a' and 132a' in the third direction, the insulating layers 131b' and 132b' may be disposed to not cover both end portions of the conductive layers 131a' and 132a' in the second direction, respectively, as illustrated in FIG. 10. Also, each of the insulating layers 131b' and 132b' may have a thickness that is smaller in both end portion than in a center portion in the third direction.

Accordingly, the first insulating layer 131b' may have a smaller size in the third direction than the first conductive layer 131a', and the second insulating layer 132b' may have a smaller size in the third direction than the second conductive layer 132a'.

Thus, a first additional plating layer 151 may be disposed on the other end portion of the first conductive layer 131a' in the third direction, and a second additional plating layer 152 may be disposed on the other end portion of the second conductive layer 132a' in the third direction. The first and second additional plating layers 151 and 152 may be formed in a plating process for forming plating layers 141b', 142b', and 143b', and may be formed of the same type of material as the plating layers 141b', 142b', and 143b'.

As set forth above, according to the exemplary embodiment in the present disclosure, the external electrodes are disposed on one surface of the body after disposing the connection portions, thereby improving a capacity per unit volume of the multilayer electronic component.

In addition, the insulating layers are formed on the conductive layer, thereby improving reliability.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
    a body including dielectric layers and first and second internal electrodes alternately disposed in a first direction with the dielectric layers respectively interposed therebetween, and having first and second surfaces opposing each other in the first direction, third and fourth surfaces connected to the first and second surfaces and opposing each other in a second direction, and fifth and sixth surfaces connected to the first to fourth surfaces and opposing each other in a third direction;
    a first connection portion including a first conductive layer disposed on the third surface of the body and connected to the first internal electrodes and a first insulating layer disposed on the first conductive layer;
    a second connection portion including a second conductive layer disposed on the fourth surface of the body and connected to the first internal electrodes and a second insulating layer disposed on the second conductive layer;
    a first external electrode disposed on the sixth surface of the body and including a first electrode layer connected to the first conductive layer and a first plating layer disposed on the first electrode layer;
    a second external electrode disposed on the sixth surface of the body and including a second electrode layer connected to the second conductive layer and a second plating layer disposed on the second electrode layer; and
    a third external electrode disposed between the first and second external electrodes on the sixth surface of the body and including a third electrode layer connected to the second internal electrodes and a third plating layer disposed on the third electrode layer,
    wherein a thickness of each of first end portions of the first and second conductive layers is smaller than a thickness of a center portion of each of the first and second conductive layers, and
    wherein the first electrode layer extends further from the sixth surface of the body to cover, in the second direction, at least a portion of the first end portion of the first conductive layer, and the second electrode layer extends further from the sixth surface of the body to cover, in the second direction, at least a portion of the first end portion of the second conductive layer.

2. The multilayer electronic component of claim 1, wherein the first conductive layer is disposed in a range not beyond the third surface of the body, and the second conductive layer is disposed in a range not beyond the fourth surface of the body.

3. The multilayer electronic component of claim 1, wherein the first and second conductive layers include metal and glass, and the metal included in the first and second conductive layers is in the same type as metal included in the first and second inner electrodes.

4. The multilayer electronic component of claim 3, wherein the metal, which is in the same type as the metal included in the first and second inner electrodes, is nickel (Ni).

5. The multilayer electronic component of claim 1, wherein the first insulating layer is disposed in a range not beyond an external surface of the first conductive layer, and the second insulating layer is disposed in a range not beyond an external surface of the second conductive layer.

6. The multilayer electronic component of claim 1, wherein the first and second electrode layers include conductive metal and glass.

7. The multilayer electronic component of claim 1, wherein a maximum size of the multilayer electronic component in the second direction is 1.1 mm or less, and a maximum size of the multilayer electronic component in the first direction is 0.55 mm or less.

8. The multilayer electronic component of claim 1, wherein a first end portion of each of the first internal electrodes in the second direction is connected to the first conductive layer, and a second end portion of each of the first internal electrodes in the second direction is connected to the second conductive layer.

9. The multilayer electronic component of claim 1, wherein each of the second internal electrodes includes a lead portion disposed to be spaced apart from the third and fourth surfaces of the body and connected to the sixth surface of the body.

10. The multilayer electronic component of claim 1, wherein a thickness of each of second end portions of the first and second conductive layers, opposing the respective first end portions, is smaller than a thickness of the center portion of each of the first and second conductive layers.

11. The multilayer electronic component of claim 10, wherein the first and second insulating layers do not cover, in the second direction, the first end portions and the second end portions of the first and second conductive layers, respectively.

12. The multilayer electronic component of claim 11, wherein a thickness of an end portion of each of the first and second insulating layers is smaller than a thickness of a center portion of each of the first and second insulating layers.

13. The multilayer electronic component of claim 11, wherein a first additional plating layer is disposed on the second end portion of the first conductive layer in the second direction, and a second additional plating layer is disposed on the second end portion of the second conductive layer in the second direction.

14. A multilayer electronic component comprising:
a body including dielectric layers and first and second internal electrodes alternately disposed in a first direction with the dielectric layers respectively interposed therebetween, the first internal electrodes being exposed to two end surfaces of the body opposing in a second direction, the second internal electrodes being exposed, in a third direction, to a mounting surface of the body perpendicular to the end surfaces;
a pair of connection portions each including a conductive layer disposed on one of the end surfaces of the body and connected to the first internal electrodes and an insulating layer disposed on the conductive layer;
first and second external electrodes disposed on the mounting surface of the body and connected to the conductive layers of the pair of connection portions, respectively; and
a third external electrode disposed between the first and second external electrodes on the mounting surface of the body and connected to the second internal electrodes,
wherein each of the first, second, and third external electrodes has a convex shape, wherein, in the second direction, a thickness of each of the first, second, and third external electrodes at a center portion thereof is larger than a thickness of each of the first, second, and third external electrodes at both end portions thereof.

15. The multilayer electronic component of claim 14, wherein the first and second external electrodes include first and second electrode layers connected to the conductive layers, respectively, and first and second plating layers disposed on the first and second electrode layers, respectively, and
the third external electrode includes a third electrode layer connected to the second internal electrodes and a third plating layer disposed on the third electrode layer.

16. The multilayer electronic component of claim 14, wherein the first internal electrodes are spaced apart from the mounting surface of the body, and
the second internal electrodes are spaced apart from the end surfaces of the body.

17. A multilayer electronic component comprising:
a body including dielectric layers and first and second internal electrodes alternately disposed in a first direction with the dielectric layers respectively interposed therebetween, the first internal electrodes being exposed to two end surfaces of the body opposing in a second direction, the second internal electrodes being exposed, in a third direction, to a mounting surface of the body perpendicular to the end surfaces;
a pair of connection portions each including a conductive layer disposed on one of the end surfaces of the body and connected to the first internal electrodes and an insulating layer disposed on the conductive layer;
first and second external electrodes disposed on the mounting surface of the body and connected to the conductive layers of the pair of connection portions, respectively; and
a third external electrode disposed between the first and second external electrodes on the mounting surface of the body and connected to the second internal electrodes,
wherein a maximum length of the insulating layer in the third direction is smaller than a maximum length of the conductive layer in the third direction.

* * * * *